United States Patent [19]
Carlson

[11] 3,894,393
[45] July 15, 1975

[54] POWER GENERATION THROUGH CONTROLLED CONVECTION (AEROELECTRIC POWER GENERATION)

[75] Inventor: Phillip R. Carlson, Pasadena, Calif.

[73] Assignee: Lockheed Aircraft Corporation, Burbank, Calif.

[22] Filed: May 2, 1974

[21] Appl. No.: 466,178

[52] U.S. Cl. ................................................. 60/641
[51] Int. Cl. ...................... F03g 7/00; F01k 23/00
[58] Field of Search ............. 60/641, 398, 682, 650

[56] References Cited
UNITED STATES PATENTS
3,436,908  4/1969  Van Delic ............................ 60/641

*Primary Examiner*—Martin P. Schwadron
*Assistant Examiner*—H. Burks, Sr.
*Attorney, Agent, or Firm*—Billy G. Corber

[57] ABSTRACT

A method and means for the generation of power from a controlled air flow, wherein an enclosed air mass is cooled at high altitude below the temperature of the surrounding air. The air is isolated from the surrounding air by means of a large duct. The resulting cooler, denser air flows down the duct toward lower altitude, and the energy of the falling air mass is extracted by means of a turbine generator.

4 Claims, 3 Drawing Figures

POWER GENERATION THROUGH CONTROLLED CONVECTION (AEROELECTRIC POWER GENERATION)

BACKGROUND OF THE INVENTION

The demands for power are increasing at a tremendous rate, roughly doubling every 10 years; yet the world's natural resources such as fossil fuels (coal and oil) and natural gas are rapidly being depleted. The development of other sources such as new steam or nuclear plants are impeded. New sources of nonpolluting power are urgently in need, and it is toward this end that the present invention is directed.

The primary sources of power are hydroelectric, the so-called fossil fuels, natural gas and nuclear plants. Economical means of tapping solar energy and geothermal energy await man's ingenuity. The least offensive of these sources, from a pollution standpoint, is hydroelectric, but today it makes up less than 20 percent of the total power output in the United States. Although only a small percent of the world's total hydroelectric potential has been utilized, the remaining sources are not readily exploitable and cannot make a very large contribution toward satisfying the growing power demand.

Past efforts to harness energy in moving air have been nominal. The reader is no doubt familiar with the picturesque windmills which are driven by surface winds and in turn drive electric generators or are used as prime movers. However, windmills like sails are motionless and of no avail in the absence of wind. It is the purpose and intent of this invention to create a substantially constant flow of air and to utilize the resultant flow to generate electric power.

Before discussing the invention, a review of atmospheric phenomena is believed to be in order. The following will be restricted to surface phenomena, and such effects as the jet streams and the coriolis force will not be included.

Winds are usually caused by atmospheric pressure differentials which are in turn related to temperature and density of local air. As an example, consider the air space over the ocean and the adjacent land masses. The sun warms the land, which warms the air above it, decreasing its density. The warm, less dense air rises, creating a lower pressure zone. The cooler, denser air over the ocean flows in under the warmer land air. The rising warm air cools adiabatically and overflows the ocean air, increasing the pressure. Thus, a natural convection occurs, air moves from the ocean to the land, rising, and then after cooling falls over the ocean. This phenomena is observed as the cool afternoon breezes in the summer blow in from the ocean.

A more violent movement of air resulting from temperature and density differences occurs in thunderstorms and other weather phenomena. These natural processes involved in the creation of winds are accompanied by the transformation of large amounts of energy. It has been suggested that the power in the atmospheric winds is about $3 \times 10^{17}$ kw. per year. Yet the fraction of the energy of meteorological processes which can be captured for use by man is extremely small.

The foregoing is typical of wind effects over large surface areas, in the so-called horizontal plane. Now, as previously stated, the density of air decreases as the altitude increases. Likewise, the temperature normally decreases with increase of altitude, commonly referred to as the lapse rate. The dry adiabatic lapse rate is approximately 1° C. per 100 meters of elevation. If the known phenomena of winds could be combined with the lapse rate and density aspects relative to altitude, winds in the vertical plane could be generated.

It is the purpose of this invention to carry out processes similar to those occurring in nature under controlled conditions in order to harness the energy and generate electrical power.

Another object of the invention is to utilize the lapse rate and different air densities to generate vertical or near vertical winds for aeroelectric power generation.

The foregoing and other objects and advantages will become apparent from the following detail description when taken with the drawings, in which.

In its most basic form, the invention consists of two elements, an air duct leading between two points of substantial difference in elevation and an air turbine within the duct to remove power from the moving air in the duct. Movement of air within the duct is accomplished by an arrangement so that the density of air within the duct is substantially different from the density of air outside the duct. This difference in density causes a pressure gradient which results in air movement in a manner similar to the offshore breeze or the thunderstorm. By confining the moving air in a duct, a large percentage of the available energy can be extracted and applied to useful work. The air inside the duct is cooled by the evaporation of water so as to increase the density of the inside air.

Figure 1:
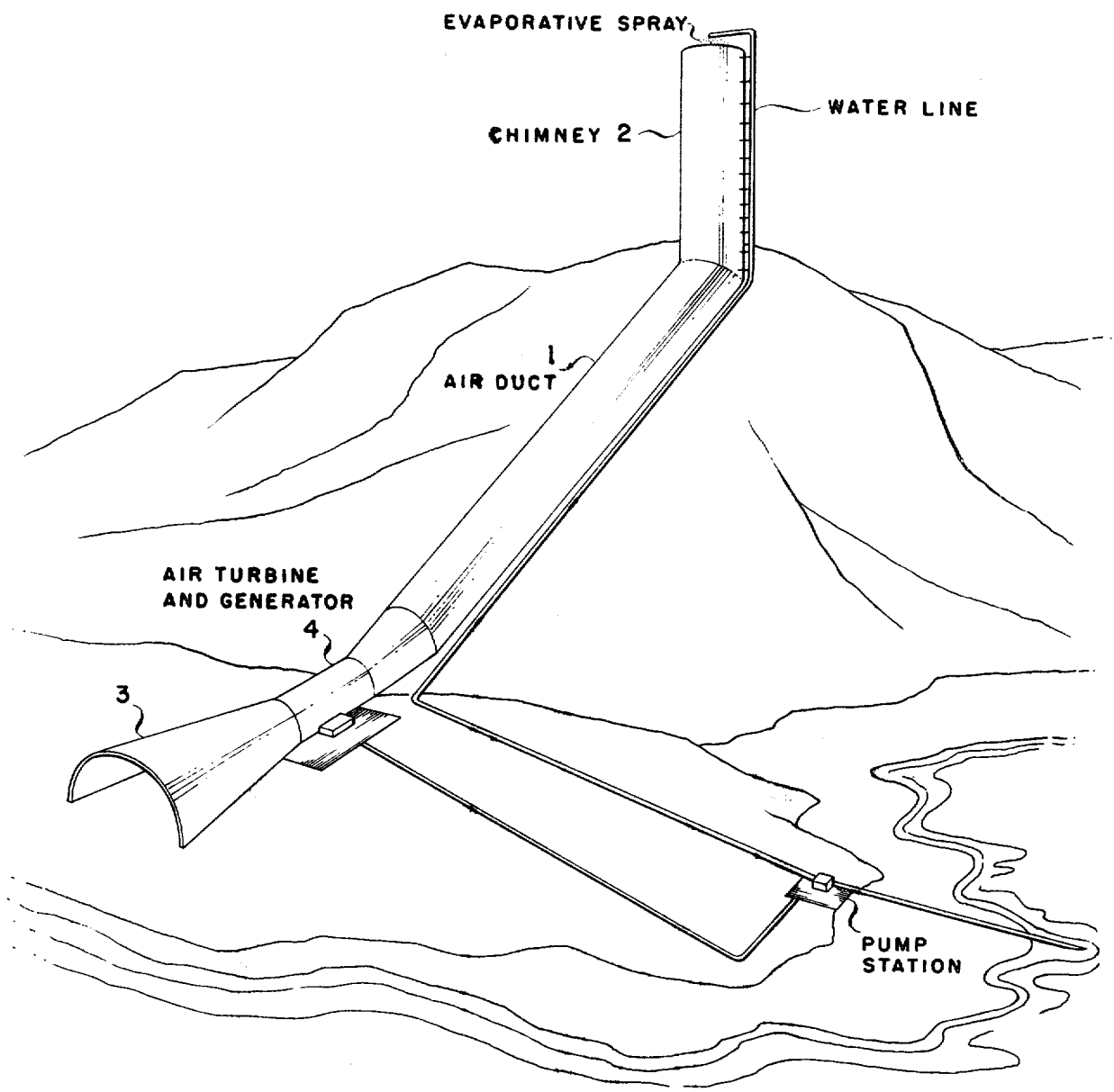
FIG. 1 is a schematic diagram of an aeroelectric power system in accordance with the invention.

Turning now to the drawings, FIG. 1 shows the general arrangement of the invention. The air duct 1 extends from an exit area 3 through a constricted portion 4, where an air turbine and electrical generator are located, thence up a slope of a hill or mountain. Depending on the elevation difference available from natural terrain, it may or may not be desirable to add a chimney 2 at the top of the hill or mountain. Water from a nearby source, such as a lake, river or ocean, is pumped to the top of the duct where it is sprayed into the air. Evaporation of the water cools the air and causes it to become more dense than the surrounding air. As the air "flows" down the duct, it is heated by adiabatic compression. Water may be sprayed in the duct periodically on the air as it descends to provide further cooling by evaporation, if desired, such as to overcome the effects of compressional heating. The difference in density of air inside the duct and outside the duct creates a pressure difference across the turbine. The pressure difference multiplied by the volume of air passing per second is a measure of power available from the turbine.

The temperature and density differences which may be achieved between the inside and outside air are dependent on the local temperature of the day, the lapse rate of the outside air, and the relative humidity of the air as it enters the duct. These factors are illustrated in FIG. 2, with the relative humidity of the air entering the duct assumed to be 25 percent.

Figure 2:
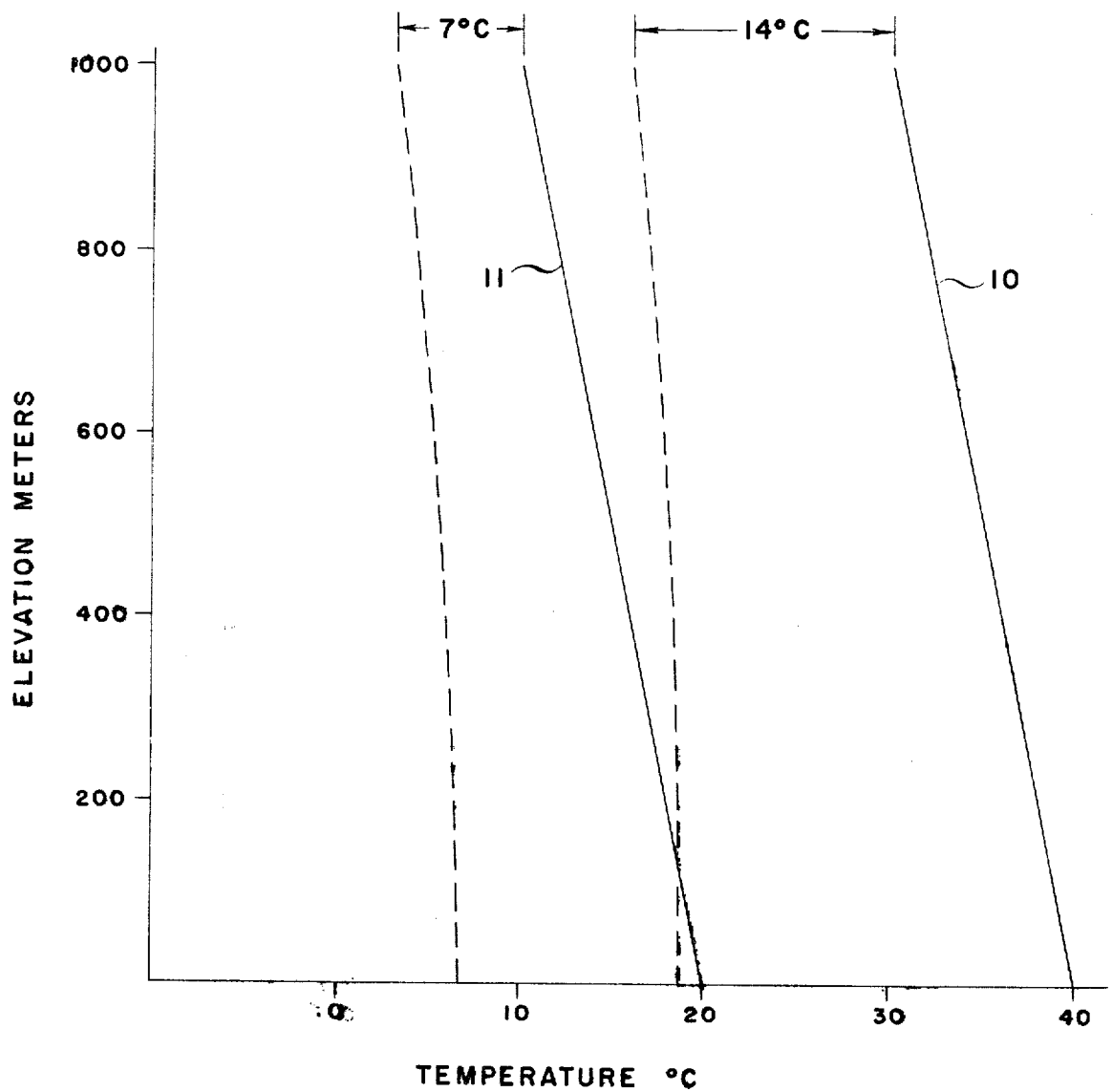
FIG. 2 is a graph showing typical operation of the invention for the dry adiabatic lapse rates for two surface temperatures.

At the right of FIG. 2, the straight line 10 represents the dry adiabatic lapse rate of the atmosphere, where the temperature at 1000 meters (top of the duct) is 30° C., and a surface, sea level temperature is 40° C. (104° F.). Line 11 represents the dry adiabatic lapse rate where the temperature at the top of the duct is 10° C., and a surface temperature is 20° C. (68° F.).

The duct elevation difference from top to bottom is assumed to be 1 kilometer. The spray of water is assumed to bring the air in the duct to 100 percent relative humidity. This cools the 30° C. air by 14° C. to 16° C. The 10° C. air cannot be cooled as much by evaporation since less moisture is required to bring it to saturation. It cools about 7° C. as indicated.

If moisture is introduced to keep the air saturated as it moves down the pipe, it will follow the saturated adiabatic lapse rate as illustrated, or less than 1° C. per 100 meters. The air outside the pipe may follow the dry adiabatic lapse rate or it may follow a lower lapse rate. In desert areas, the dry adiabatic lapse rate is typical while in more humid areas the lapse rate is generally less.

Comparison of the curves shows the effect of initial ambient temperature on the temperature difference and hence the density difference between inside and outside air. The higher the lapse rate of the outside air the greater the density difference which is achieved. The effect of initial relative humidity is not shown but the initial cooling by evaporation is approximately proportional to the difference between the initial relative humidity and saturation.

The operation of the device can be visualized more clearly by considering a practical installation. West of the Salton Sea in southern California the terrain rises to an altitude of 4800 feet in a distance of about 5 miles. Water is available from the Salton Sea. A duct, for example 100 feet in diameter, could readily be built from the flat area to the top of the ridge. The duct would be somewhat less than 5 miles in length. The weather in this area is hot in summer with ground temperatures frequently reaching 120° F. The lapse rate is generally equal to the dry adiabatic lapse rate and is somewhat greater than this rate near the surface. The humidity of air at the top of the ridge is generally low.

On a representative day with a ground temperature of 104° F. (40° C.), introduction of a water spray at the top of the duct and at intervals on the way down would allow the inside air to be an average of 14° C. less than the temperature of the outside air. If the duct were of uniform size all the way down with no turbine inside, the air would flow down the duct at 29 meters per second or slightly less than 60 knots. This speed is determined by equilibrium between the energy input from the density difference of the inside air and the losses to drag and kinetic energy of the air exiting from the duct. At 60 knots the two losses are about equal. The kinetic energy loss can be decreased by flaring the lower end of the pipe to a larger diameter so that the exit velocity of the air is cut down. When the exit is flared to 140 feet in diameter, the exit velocity will be cut in half and the kinetic energy losses will be cut to one-fourth of their previous value. The air in the duct moves faster until the increased drag losses just balance the energy input. The air speed in the main duct would now be 72 knots.

A constriction can be introduced in the pipe, decreasing the diameter and increasing the air velocity at that point. If the constriction is properly shaped there will be little energy loss due to its presence. For example, the duct dimensions may be reduced to 70 feet diameter over a short interval and the air velocity in that section will rise to approximately 140 knots. A windmill or air turbine is introduced in the constricted section. The blades are set at about a 45° angle to the wind and the blade tips will also move at 140 knots or about 1 revolution per second.

As long as there is no resistance to the blade, turning the windmill will absorb little energy. A generator is connected to the windmill and allowed to absorb energy; the windmill will slow down and the blades will meet the air flow at an angle of attack, causing a pressure difference between the two sides of the blade. This pressure difference will oppose the pressure difference due to the air density difference and the air in the duct will slow down. As the air movement slows down, less and less energy is lost to drag losses and kinetic energy losses. If the turbine or windmill is operated with enough power to the generator so that the air movement slows down to about 70 knots in the constricted area, the losses will be reduced to one-fourth of their previous value and three-fourths of the energy would go into useful work. Under these conditions, the gross input of the energy into the system would be at a rate of about 14 megawatts. Power available at the turbine is slightly over 10 megawatts. The turbine is about 90 percent efficient, so useful power is 9.5 megawatts. The pumping power required to bring the water to the top of the duct is about 2 megawatts, leaving a net output of 7.5 megawatts.

The above example is a very small scale system by today's power standards. Larger ducts are feasible. A 300-foot diameter duct would be capable of 9 times the power but the losses are decreased also for the larger size, giving a higher wind velocity and even greater power.

The terms "air turbine" and "windmill" have been used interchangeably in this discussion. Actually, the air turbine would be very similar to a windmill but would add some features to increase efficiency. One difference from the conventional windmill is of course the fact that it is in a duct. One of the major losses in conventional windmills is the tip loss. This loss is virtually eliminated by bringing the blade tips to within a very short distance of the wall of the duct. Secondly, the hub diameter would be greater than a conventional windmill. This permits better matching of the inner and outer sections of the blade to the air velocity. Finally, in some cases a row of stator blades would be introduced to give the air a slight rotation before it hits the moving blades. All of these refinements do not alter the basic principle. The air turbine is essentially a windmill redesigned to maximize efficiency. Air velocity through the turbine will be controlled by the setting of the fixed and rotating blades of the air turbine.

The net power output of the device is the gross power available from the turbine, minus the power to pump the water and the power lost in duct drag and emerging air kinetic energy. This can be expressed mathematically as follows:

$$P = \int_0^{h_o} [\rho_i(h) - \rho_o(h)] \, dh \, V_a \, g \, E_T$$
(gross power)

-Continued $$- \frac{\rho_w V_w h_w g}{E_p} - C_F \tfrac{1}{2} \rho_i U_D^3 A_D \quad (1)$$
(pump loss) (duct drag loss)

$$- \tfrac{1}{2} \rho_e U_e^2 Va$$
(exit loss)

Where:
- $P$ is the net power output.
- $h_D$ is the total elevation difference from the bottom to the top of the duct.
- $\rho_i(h)$ is the density inside the duct as a function of the elevation $h$.
- $\rho_o(h)$ is the density outside the duct.
- $Va$ is the volume of air per second flowing through the duct.
- $g$ is the acceleration of gravity.
- $E_T$ is the efficiency of the turbine.
- $E_P$ is the efficiency of the pump.
- $\rho_w$ is the density of the water.
- $V_w$ is the volume of water per second pumped up the pipe.
- $h_w$ is the height through which the water must be lifted.
- $E_P$ is the total over-all efficiency of the pump system including friction losses in the pipe.
- $C_F$ is the coefficient of friction.
- $U_D$ is the velocity of the air in the duct.
- $U_e$ is the exit velocity of the air.
- $\rho_e$ is the density of the air at the exit.

An important consideration is the ratio of the power required to lift the water to the top of the duct to the power output available from the air passing through the turbine. This ratio will now be calculated. Consider a mass of air $M_a$ at the top of the duct. If a mass of water $M_w$ is evaporated into the mass of air, it will be cooled by a temperature difference $\Delta T$, where $$\Delta T = \frac{M_w H_r}{M_a S_a}$$

$H_r$ is the heat of vaporization of water and $S_a$ is the specific heat of air.

The air outside the duct is assumed to follow the dry adiabatic lapse rate. Without the addition of the water, the air inside the duct would follow the dry adiabatic lapse rate and the temperature difference $\Delta T$ between the inside and outside air would remain constant.

The energy available due to the movement of the mass of air down the duct is the negative buoyancy on that mass multiplied by $g.h_D$. By Archimedes' principle, the negative buoyancy is the weight of the air mass $M_a$ minus the weight of an equal volume of air on the outside of the pipe which is $$M_a \frac{\rho_o}{\rho_i}.$$

Thus, the energy available from the movement of the air is $$\left(M_a - M_a \frac{\rho_o}{\rho_i}\right) gh = M_a \frac{\Delta T}{T_o} gh = \frac{M_w H_r}{S_a T_o} gh$$

The ratio of the output work to the work required to raise the water is $$\frac{\frac{M_w H_r}{S_a T_o} gh}{M_w gh} = \frac{H_r}{S_a T_o}$$

Putting in the values of the constants the ratio is about 8. In other words, the output work neglecting losses is approximately 8 times the work required to raise the water to the top of the duct. In an actual installation, the inefficiencies and losses will reduce this figure but a substantial net output power remains.

In order to substantiate the feasibility of the device, a brief discussion will now be presented of the various factors in equation (1). Output power will be maximized by maximizing $[\rho_i(h) - \rho_o(h)]$. Site selection will determine the initial temperature, relative humidity and external lapse rate. An important additional consideration is the rate of evaporation of the water since the integral will be increased if the evaporation is rapid. The rate of evaporation of water droplets is given by the formula $$r \frac{dr}{dt} = D \left( \frac{\rho_V}{\rho_L} \frac{P - P_r'}{P_r'} \right)$$

- $r$ is the radius of the droplet.
- $D$ is the diffusivity.
- $\rho_V$ is the density of the water vapor.
- $\rho_L$ is the density of the liquid water.
- $P$ is the partial pressure of the vapor at a distance from the droplet.
- $P_r'$ is the partial pressure of the vapor at the surface of the droplet.

Under conditions of constant humidity, this equation can be integrated. The time required to completely evaporate the droplet is $$t_{er} = \frac{r^2}{2D \frac{\rho_V}{\rho_L} \frac{(P_r' - P)}{P_r'}}$$

This is very strongly a function of the droplet radius and can be made as rapid as desired by making the droplets small. For droplets less than ½ millimeter in diameter the evaporation occurs initially in a few seconds, so that the inside density reaches its maximum value in only a small fraction of the length of the duct.

Figure 3:
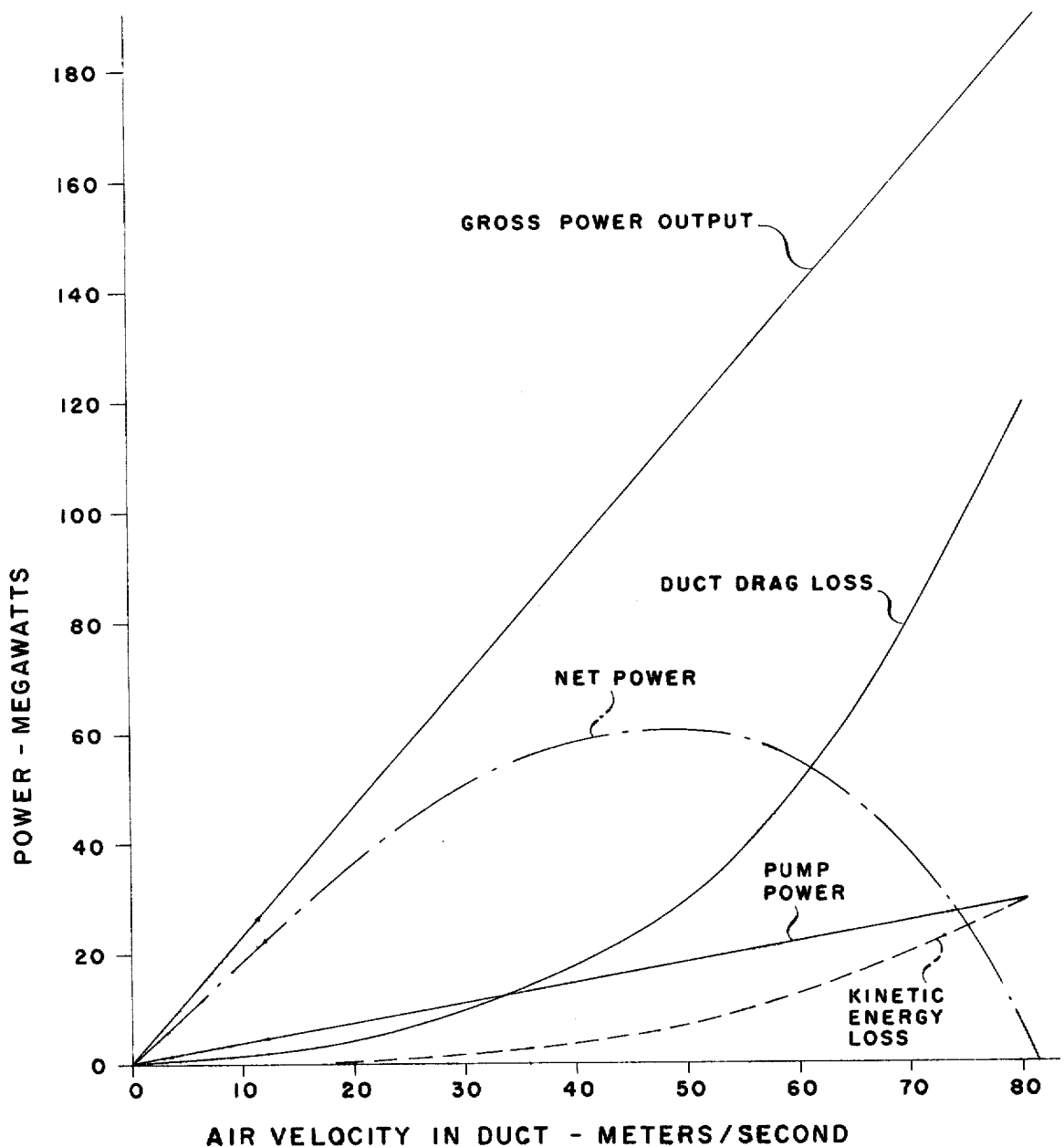
FIG. 3 is a graph of power distribution versus air velocity.

The last two terms of equation (1) are the losses due to duct friction and kinetic energy of the exit air. Both of these losses increase as the cube of the air velocity while the power output of the turbine increases linearly with air velocity. As a result, there is an optimum air velocity for maximum power as illustrated in FIG. 3. In this case, the net power reaches a peak at an air velocity of 50 meters/sec.

It is apparent from the foregoing that the preferred embodiment described is by no means a limitation of the invention. Modifications, such as other means for cooling the air, should be apparent.

What is claimed is:

1. An aeroelectric power generation system comprising: an elongated duct means having one end at a higher altitude than the other end; means for adding water to the air in the duct at the higher altitude for lowering the temperature of the air in said one end as compared to the temperature outside the duct, thereby causing an air flow in the duct means; and means located in the duct at a low altitude adjacent said other end for extracting energy from the air flow in the duct.

2. A power generating system as defined by claim 1, wherein the ends of the duct are separated by about 5,000 feet in altitude.

3. A power generating system as defined by claim 1, and wherein the means for extracting energy is a turbine generator.

4. A method for generating wind power comprising: isolating a column of air from the surrounding air, one end of the column being at substantially higher altitude than the other, lowering the temperature of the air column by adding moisture thereto which evaporates at the higher altitude to thereby increase the relative humidity and density of the air and cause a flow of air down the column, extracting energy from the air flow at the lower end of the column.

* * * * *